United States Patent [19]

Sugerman et al.

[11] Patent Number: 5,173,113
[45] Date of Patent: Dec. 22, 1992

[54] COMPOSITION FOR INK VEHICLES AND PROTECTIVE COATINGS

[75] Inventors: Gerald Sugerman, Allendale, N.J.; Michael W. O'Neill, Abbotsford, Canada

[73] Assignee: Topez Company, British West Indies

[21] Appl. No.: 668,072

[22] Filed: Mar. 12, 1991

[51] Int. Cl.$^5$ .................. C09D 11/06; C08L 91/00
[52] U.S. Cl. ...................106/27 R; 106/28 R; 106/252; 106/253; 106/266; 106/27 A; 106/29 R
[58] Field of Search .................. 106/27, 28, 252, 253, 106/266; 260/404.8, 410.6

[56] References Cited

U.S. PATENT DOCUMENTS

| | | | |
|---|---|---|---|
| 2,063,869 | 12/1936 | Ellis | 106/222 |
| 2,141,546 | 12/1938 | Strain | 526/240 |
| 2,160,532 | 5/1939 | Barrett et al. | 260/407 |
| 2,276,176 | 3/1942 | Flint et al. | 260/407 |
| 2,345,858 | 4/1944 | Mighton | 260/407 |
| 2,381,881 | 8/1945 | Rothrock | 106/252 |
| 2,381,882 | 8/1945 | Cupery | 106/252 |
| 2,381,883 | 8/1945 | Brubaker | 106/252 |
| 2,382,297 | 8/1945 | Cupery | 104/91 |
| 2,404,204 | 7/1946 | Agens et al. | 260/407 |
| 2,452,029 | 10/1948 | Bruson et al. | 260/405 |
| 2,462,209 | 2/1949 | Minter | 106/243 |
| 2,536,568 | 1/1951 | Pollack | 260/407 |
| 3,010,925 | 11/1961 | Lynn | 260/410.7 |
| 3,169,079 | 2/1965 | Ferington et al. | 260/407 |
| 3,224,989 | 12/1965 | Nevin | 260/405 |
| 3,753,968 | 8/1973 | Ward | 562/509 |
| 3,952,032 | 4/1976 | Vrancken et al. | 260/407 |
| 4,035,320 | 7/1977 | Lawson | 525/32.1 |
| 4,045,394 | 8/1977 | Hess | 260/405 |
| 4,076,665 | 2/1978 | Lawson | 525/32.1 |
| 4,101,477 | 7/1978 | Lawson | 106/27 |
| 4,248,997 | 2/1981 | Ihida | 528/272 |
| 4,366,099 | 12/1982 | Gaetani et al. | 260/407 |
| 4,469,516 | 9/1984 | Schneider et al. | 106/27 |
| 4,513,349 | 4/1985 | Olson et al. | 260/410 |
| 4,515,931 | 5/1985 | Olson et al. | 526/323.2 |
| 4,533,710 | 8/1985 | Olson et al. | 526/323.2 |
| 4,552,634 | 11/1985 | Franey | 524/375 |
| 4,574,057 | 3/1986 | Kaza et al. | 106/27 |
| 4,578,117 | 3/1986 | Nakanishi | 106/28 |

FOREIGN PATENT DOCUMENTS 0305006 8/1988 European Pat. Off. .

OTHER PUBLICATIONS

Acryloid, sales brochure of Rohm and Haas for thermoplastic acrylic resins, Nov. 1990, pp. 1, 2, 5, 16, 20, 33 and 34.
Acryloid DM-55, Rohm and Haas Products for the Graphic Arts (May 1990), pp. 1–3.

Primary Examiner—Mark L. Bell
Assistant Examiner—Helene Klemanski
Attorney, Agent, or Firm—Hopgood, Calimafde, Kalil, Blaustein & Judlowe

[57] ABSTRACT

An improved composition for use as a liquid vehicle in ink systems and for printing on diverse substrates. The functional constituents of the compostiion are unsaturated fatty acid esters, difunctional or multifunctional acrylate esters and optionally mixed esters of unsaturated fatty acid and difunctional or multifunctional acrylates and other alpha, beta unsaturated carboxylates. Lithographing ink vehicle formulations of these improved components exhibit exceptional performance. In application, the improved compositions permit a substantial reduction or elimination of solvents and certain drying agents that otherwise form toxic and environmentally sensitive byproducts.

21 Claims, No Drawings

COMPOSITION FOR INK VEHICLES AND PROTECTIVE COATINGS

This invention relates to a specific class of compositions that exhibit a unique combination of physical properties consistent with exceptional inking characteristics. More particularly, the present invention relates to low or non-solvent ink vehicles for use in ink printing operations characterized by good wetting and adhesive properties.

BACKGROUND OF THE INVENTION

Printing technology has evolved over the centuries from a discipline considered an art form to one now dominated by the strictures of organic and surface chemistry. In the present context, inks are film forming compositions that dry to a thickness between 0.2 and 30 microns. In general, inks consist of two major components: the colorant (a pigment or dyestuff) and the vehicle (the liquid carrier that suspends or dissolves the colorant). The primary functions of the vehicle is to carry the colorant to the printed surface and thereafter harden and bind the colorant to the surface.

Although the technology underlying ink printing extends back several centuries, the industry supports a high profile, fast paced rate of technical advancement. The contours of the marketplace are continually placing new restrictions and pressures on ink developers. Recently, this is reflected by the advanced computer control presses capable of speeding the stock through the various printing stations at unprecedented rates. Although this permits substantial increases in printing output, it significantly reduces the attendant drying time. This translates to ink formulations having a requisite dry/cure period that corresponds to the faster cycles.

A related development involves worker and the general public's exposure to specific hazardous compounds in the plant environments and nearby community. Occupational Safety and Health Agency (OSHA) and Environmental Protection Agency (EPA) requirements regarding toxic and potentially carcinogenic materials have significantly restricted the permitted environmental concentrations of commercially important solvents. In response, the solvent loading and heavy metal drying agents in ink formulations must be handled in a manner that inhibits the build-up of solvents and/or other toxins in the plant, its environment and its waste streams.

It can be recognized that the above factors have created a strong incentive to printers to reduce and/or eliminate the solvents and heavy metal dryers employed in their ink formulations. The problem, of course, is that ink performance is usually tied directly to threshold levels of solvents that preserve low viscosity, spreadability, and good color (pigment) distribution. There has, heretofore, been a trade-off between speed and performance, and the above-noted environmental concerns.

Prior art ink systems have normally consisted of organic composition comprising oils and resins, appropriate viscosity controlling solvents, dryers and of course the requisite pigment or dyestuff. During the printing operation, the composition is selectively applied to the substrate and thereafter cured. Exemplary constituents include drying vegetable oils such as glyceride esters of unsaturated fatty acid esters. The unsaturation or double bond content of these esters permits a spontaneous cross-linking reaction in the presence of oxygen. For example, linolenic acid (the main constituent of linseed oil) and its isomeric varieties have long been effective drying components of coating and printing ink compositions. Attention is directed to *The Printing Ink Manual*, Van Nostrand Reinhold (Int'l) Co., Ltd. 4th Ed. (1988) which is herein incorporated by reference as if restated in full.

Oils have often been combined with selected resins such as (polydicycyclo) pentadiene, rosin, polyterpenes and alkyds to promote drying and film integrity over time. Both natural and synthetic resins have been used, but the major difficulty in application remains the matching of oil/resin properties that address a broad level of requirements. There continues to exist a market need for new and improved formulations of coatings and inks such that the liquid vehicles are substantially solvent-free and also suitable for simple, quick and low cost effective curing, without the need for additives, e.g., hazardous organic peroxides or radiation for radical formation or heavy metal ions as so-called driers, e.g., cobalt and manganese.

It was the above challenges that gave rise to the development of the present invention.

SUMMARY OF THE INVENTION

It is object of the present invention to provide new and improved low or nonsolvent ink vehicles prepared by combining difunctional and or oligofunctional unsaturated fatty acid esters with difunctional or multifunctional alpha, beta unsaturated carboxylate esters in a blend or in a unimolecular species that can be cured rapidly at ambient or elevated temperatures without resorting to hazardous exogenous catalysts.

It is another object of the present invention to provide a composition for ink vehicles that exhibits low viscosity with minimal or no solvent loading thereby avoiding high cost investment in plant equipment and labor for the scrubbing of hydrocarbon or distillate solvents.

It is a further object of the present invention to provide a fluid carrier at ambient temperature that is efficiently applied to many diverse substrate materials.

It is yet another object of the present invention to provide a hardenable surface coating that is highly resistant to abrasion and corrosion.

It is a further object of the present invention to provide a method of preparing a low solvent or non-solvent ink system with superior curing properties.

It is still another object of the present invention to provide a method of printing using a vehicle comprising di and/or oligo unsaturated fatty acid esters in combination with difunctional or multifunctional alpha, beta unsaturated esters.

The above and other objects of the present invention are realized in a specific illustrative composition comprising a blend of di unsaturated and/or oligo unsaturated fatty acid esters in combination with difunctional or multifunctional alpha, beta unsaturated carboxylate esters at selected concentrations. The following compounds are suitably employed in the inventive compositions and at the designated proportions and (i) a di and/or oligo unsaturated fatty acid ester component of general formula,

$$[C_nH_{2(n-x)+1}C(O)O-]_mR; \qquad (I)$$

(ii) a difunctional or multifunctional acrylate ester or derivative component of general formula, $$[A(H)C=C(B)C(O)O-]_mR; \quad (II)$$

wherein

R is a divalent or oligovalent hydrocarbyl or oxygenated hydrocarbyl radical having from two to eighteen carbon atoms; A and B are independently hydrogen, monovalent hydrocarbyl ligands or oxygenated hydrocarbyl ligands with up to six carbon atoms each ligand;

n is an integer ranging from 6 through 21;

x is an integer ranging from 2 through 4;

m is an integer ranging from 2 through 11; and the components (i) and (ii), collectively, being at least about 30% by weight and each component not less than about 10% by weight of the liquid portion.

In accordance with the varying aspects of the present invention, the bifurcated system expressed above can alternatively be formed as a combination (iii) representing the constituents of formulas (I) and (II) in a molecule. In this context, the inventive composition conforms to the following representation:

a mixed ester component combining both unsaturated fatty ester and alpha, beta di and/or oligo unsaturated carboxylate functions according to the general formula, $$[C_nH_{2(n-x)+1}C(O)O-]_m[A(H)C=C(B)-C(O)O-]_mR, \quad (III)$$

wherein

R is a divalent or oligovalent hydrocarbyl or oxygenated hydrocarbyl radical having from two to eighteen carbon atoms; A and B are independently hydrogen, monovalent hydrocarbyl ligands or oxygenated hydrocarbyl preferably carboxylate ligands of up to six carbon atoms each;

n is an integer ranging from 6 through 21;

x is an integer ranging from 2 through 4;

m is an integer ranging from 2 through 11; and the component (iii) being at least about 25% by weight of the liquid portion.

DETAILED DESCRIPTION OF THE INVENTION

The preparation of the compositions according to the above delineated formulas is based on a combination of mixed esters of di and/or oligo unsaturated fatty acid and difunctional and/or multifunctional alpha, beta unsaturated carboxylic acid and derivatives thereof separately or as a hybrid molecular species to produce liquid vehicles which can carry pigments for implementation in an ink system.

The di and/or oligo unsaturated fatty acid esters are defined by the general formula $$[C_nH_{2(n-x)+1}C(O)O-]_mR; \quad (I)$$

the difunctional and/or multifunctional alpha, beta unsaturated carboxylate esters or derivatives thereof are defined by the general formula $$[A(H)C=C(B)C(O)O-]_mR; \quad (II)$$

and the di and/or oligo unsaturated fatty acid ester plus alpha, beta unsaturated carboxylate ester combined in a single molecular species are defined by the general formula $$[C_nH_{2(n-x)+1}C(O)O-]_mA(H)C=C(B)-C(O)O-]_mR; \quad (III)$$

wherein

R is a divalent or oligovalent hydrocarbyl or oxygenated hydrocarbyl radical having from two to eighteen carbon atoms;

A and B are independently hydrogen, monovalent hydrocarbyl ligands or oxygenated hydrocarbyl ligands with up to six carbon atoms each;

n is an integer ranging from 6 through 21;

x is an integer ranging from 2 through 4; and m is an integer ranging from 2 through 11.

The above relationships depict a selected range of molecular compounds that are related in functionality in the context of the systems employed for ink printing and coatings.

The following Tables A–C provide a cross-section of suitable species satisfying the requirements of formulas (I), (II) and (III), respectively, consistent with the present invention.

TABLE A

A list of acceptable difunctional/oligofunctional unsaturated fatty esters useful in the practice of the instant invention:

a) ethylene glycol bis 6,8-undecadienoate
b) propylene glycol bis eleomarganate
c) pinol hydrate bis eleostearate
d) tripropylene glycol bis linoleate
e) pentaerythritol tris 7,11-behenadienoate
f) arabtol tetrakis 7, 9, 11-tridecatrienoate
g) linseed oil
h) tung (chinawood) oil
j) safflower oil
k) dehydrated castor oil

TABLE B

A list of acceptable difunctional or multifunctional alpha, beta unsaturated carboxylate esters useful in the practice of the instant invention:

a) trimethylolpropane trimethacrylate
b) trimethyolpropane triacrylate
c) glycerol acrylate, bis (methyl) maleate
d) bis oleyl fumarate
e) polybutadiene diacrylate
f) pentadecanediol dicrotonate
g) tetraethylene glycol bis angelate
h) mannitol pentaacrylate
j) 1,6-hexanediol bis cinnamate
k) tris 2-(2-methyl) propenolatoethyl trimelitate
l) methylene propane trimethacrylate

TABLE C

The following is a list of species containing both difunctional or oligo-functional unsaturated fatty acid ester and alpha, beta unsaturated carboxylate ester functionalities useful in the practice of the instant invention:

a) glycerol methacrylate, bis eleostearate,
b) bis linalool maleate,
c) pentaerythritol bis crotonate, bis linolate,
d) pinol hydrate acrylate, 9,11-tetradecadienoate,
e) trimethylol propane bis furoate, eleomargate, f) ethylene glycol bis 2,4-undecadienoate, g) 2-propenoatoethyl linolenate, h) castor oil tris 2,4-undecadienoate, j) 1,2,4-hexanetriol-1,2-cyclomaleate-2,4-hexadecadienoate, and k) propylene glycol (methyl) itaconate, 4,6-pentadecadienate.

As can be realized, the hybrid molecule expresses the functionality of the di and/or oligo unsaturated fatty acid ester and alpha, beta unsaturated carboxylate ester materials in a single molecule.

The concentrations of the compounds expressed by the above formulas determine the effectiveness of the resulting compositions. Obviously, the intended use of the composition will affect the relative balance therein. To meet non-solvent requirements, the ink vehicle will preferably comprise 30% or more of combined (I) and (II) and/or (III); in other systems with some level of permitted solvent, the combined weight percent of (I), (II) and (III) will always exceed 20%. In relative terms, compounds (I) and (II) will preferably be characterized by concentrations in weighted relation, with the understanding that the concentration for each will always exceed 10%.

In the alternate configuration involving the hybrid molecule, the concentration controls the resulting properties. Again, as with the above bifurcated system, solvent use should be minimized. Reasonable operating performance is obtainable with concentrations of formula (III) compounds exceeding 25% for ink liquid vehicles.

systems) such as cobalt, cerium, manganese and zirconium.

The foregoing features of the present invention will be more readily apparent in the context of a specifically delineated set of examples directed to the application of the compositions to specific uses. Ten separate examples for the inventive inks are provided below as applied to the following specific uses and surfaces: ink offset paper coatings (Example sheet-fed lithographic printing on offset paper (Example 2), web coldset printing on uncoated paper (Examples 3 and 9), hot web offset lithography or web heatset ink (Examples 4, 5 and 6), and sheet fed printing on plastic substrates (Examples 7 and 10).

These examples are comparative in nature, being shown side by side with conventional compositions to evaluate the performance. The various formulations are presented first, followed by a presentation of the resulting ink performance.

EXAMPLE 1

This example teaches the benefits of the instant invention with respect to emissions reduction, dry rate and rub resistance of ink coatings on offset paper as compared to the prior art. The results are listed in Table 1. In particular, it will be apparent in comparing the test samples with the controls that Example 1 demonstrates significant reduction in dry time and considerably enhanced the rub resistance for certain inventive formulations ($T_2$, $T_3$, $T_5$ and $T_6$) in addition to the virtual elimination of solvent emissions.

TABLE 1

Formulations (PBW)[1]

All formulations contained 13 parts of yellow pigment (AAA), 1 part of polytetrafluroethylene (Teflon), 3 parts of carnuba wax, and 0.5 parts of surfactant (a)[2] respectively. In addition the control formulations required the addition of 0.5 each of 6% cobalt and manganese driers in order to reduce dry times to tolerable levels.

| Formulations | $C_1$ | $C_2$ | $C_3$ | $C_4$ | $T_1$ | $T_2$ | $T_3$ | $T_4$ | $T_5$ | $T_6$ | $T_7$ |
|---|---|---|---|---|---|---|---|---|---|---|---|
| Phenolic modified rosin ester | 35 | 35 | 20 | 21 | 21 | 21 | 21 | 21 | 21 | 21 | 21 |
| Gelled soya oil[3] | 13.5 | 10.5 | 28.5 | 32.5 | 32.5 | 32.5 | 32.5 | 32.5 | 32.5 | 32.5 | 32.5 |
| 520° Mineral spirits | 32 | 25 | — | — | 32 | — | — | — | — | — | — |
| No. 3 soya oil | — | — | — | — | — | — | — | — | — | 5 | 10 |
| No. 3 linseed oil | — | — | 10 | 10 | — | 25 | 20 | 15 | 30 | 5 | — |
| Castor oil tris acrylate | — | — | — | 25 | 5 | 10 | 15 | — | 20 | — | — |
| Glycerol methacylate bis eleostearate | — | — | — | — | — | — | — | — | — | 25 | 10 |
| Dry time (hr) | 21 | 34 | 28 | 33 | 11 | 1.4 | 0.3 | 24 | 2.6 | 1.2 | 4.8 |
| Tabor abrasion (100 cycles) | F | F | F | F | F | P | P | F | P | P | F |

Notes:
[1] parts by weight;
[2] Zirconium IV bis (bis 2,2-pro-penolatomethyl) butanolato, cyclo bis (bis 2,2 propenolatomethyl)butanalato diphosphato 0,0;
[3] partially hydrogenated (non-drying) oil.

Moreover, it is understood by those skilled in the art that the important viscosity is the suitable working viscosity during the actual printing operation. Depending on the application, a wide variety of additives are operable to contour the system properties to the application. These additives include surfactants such as soaps, detergents and/or coupling agents; reactive diluents such as low molecular weight unsaturated esters, amides and/or urethanes (which otherwise act as solvating agents), monofunctional acrylates and derivatives thereof, and aziridines; slip agents such as polytetrafluoroethylene, paraffin wax, polyethylene; bodying agents such as polyacrylates, fumed silica and bentonite clays; and autoxidation catalysis (for ambient air cured

EXAMPLE 2

The Example 2 demonstrates that the compositions according to the present invention (e, h, j, k) do not require heavy metal driers such as cobalt or manganese in pigmented ambient air-cured paper coatings. Formulations according to the invention and comparative controls were prepared by admixing the components as indicated below on a two roll-mill. The resultant products were applied to separate sheets of offset paper by means of conventional lithography using a standard solvent-free citric acid/guar gum based fountain solution.

| Formulations of Example No. 2 | | | | | | |
|---|---|---|---|---|---|---|
| Component (Wt %) | e | f[1] | g[2] | h | j | k |
| Lithol Rubine Pigment (LRP) | 15 | 15 | 15 | 15 | 15 | 15 |
| Bodied Tung Oil | 25 | — | — | — | 25 | — |
| No. 3 Coconut Alkyd[3] | 5 | — | 54 | — | — | — |
| Naphthenic Oil[4] | — | — | 25 | — | — | — |
| Bisphenol A Diacrylate | 25 | 50 | — | — | — | — |
| Oligomer MW 3000 | 20 | 31 | — | — | — | — |
| Acrylic Resin MW 12,000 | 4 | — | — | 5.5 | — | — |
| T-Butyl Peroxy Benzoate | — | 2 | — | — | — | — |
| 1,4-Butynediol | — | 1 | — | 1 | — | — |
| Surfactant b[5] | 0.5 | 0.5 | 0.5 | 0.5 | 0.5 | 0.5 |
| Tris 0,0',-methacrylato castor oil | — | — | — | 35 | — | 84.5 |
| Tris 0,0',0[2] methacrylato linseedonato-0, pentaerythritol | — | — | — | 19 | 59.5 | — |
| 1,4-Dimethoxy-benzene | 0.5 | — | 0.5 | — | — | — |
| Co naphthenate 12% | — | 0.5 | 0.5 | — | — | — |
| Mn naphthenate 12% | — | — | 0.5 | — | — | — |
| Trimethylol Propane Tri Acrylate (TMPTA) | 5 | — | — | 25 | — | — |

NOTES:
[1] Formulation (f; control) would not dry within 48 hours without drier (Co);
[2] Formulation (g; control) would not dry within 48 hours without both driers (Mn and Co);
[3] non-drying vehicle
[4] BP (boiling point) 400-470 degrees F.;
[5] 1,4-Butynediol.

The comparative results are listed in Table 2 below.

TABLE 2

| Test Method | e | f | g | h | j | k |
|---|---|---|---|---|---|---|
| Drying Time (Hr.) | 2.4 | 3.4 | 5.7 | 2.0 | 1.8 | 2.1 |
| 24 hr. Pencil Hardness | 2H | 3H | 2H | 3H | 3H | 3H |
| Solvent Resistance[1] | P | P | F | P | P | P |
| Abrasion Resistance[2] | P | P | P | P | P | P |
| Gloss (60 gardner) | 52 | 34 | 50 | 57 | 55 | 51 |

NOTES:
P = pass; F = fail;
[1] 200 methyl ethyl ketone rubs;
[2] 200 cycle Tabor abrasion test.

Example 2 demonstrates that in comparison the embodiment of the present invention (e) air-dries substantially faster than conventional competitors (f and g) without the need for toxic heavy metal accelerators, affords a superior high gloss product and exhibits satisfactory hardness as well as resistance to solvent and abrasion.

EXAMPLE NO. 3

The following example shows the utility of the instant formulations in the preferred embodiments of newspaper or the so-called web coldset inks. Comparative formulations were prepared by milling together the indicated combinations of different types of liquid vehicle, pigment, and additives. The preparations subsequently were applied to uncoated bond stock on a sheet-fed press employing the indicated fountain solution(s). Resulting products were tested for abrasion resistance, solvent resistance, gloss, and dot gain.

| Formulations of Example No. 3 | | | | |
|---|---|---|---|---|
| Ingredients (parts by weight) | a | b | c | d (ctl) |
| Lithol Rubine Pigment (LRP) | 6 | 6 | 7 | 8 |
| Tris [6-(2-Methyl)propenoato] hexanoato tris 1,1,1 hydroxy methylpropane | — | 47 | — | — |
| Acrylated bodied castor oil | 70 | — | — | — |
| Methacrylated light castor oil | — | — | 25 | — |
| Heavy corn oil (No. 9) | — | — | — | 16 |
| Light china oil | 19 | — | 36 | — |
| Heavy china oil (HC; No. 9) | — | 45 | 30 | 37 |
| 470 Naphtha solvent | — | — | — | 34 |
| Carnuba wax | 3 | — | — | 3 |
| Dinonyl Phenol Ethoxylate (DPE) | 2 | — | 2 | 2 |
| DPN | — | 2 | — | — |

The formulations, 3a, 3b, 3c, and 3d, for comparison were mixed four times on a water-cooled mill to give solutions having a viscosity of $(47+/-3) \times 10^3$ centipoise measured at 2 rpm using a Brookfield HBT viscometer. The products (3a, 3b, 3c and 3d) were applied to uncoated sheet-fed stock using a Multilith single color press to simulate a newsprint environment and an agar/manganese nitrate based fountain solution.

Based on comparative observations of several copies, the preferred embodiments formulated according to the present invention dried faster than the control formulation (3d), produced essentially rub-free products compared to the easily rubbed and distorted control, and provided sharper dot structures. In fact, the dot gain of the instant embodiments was found to be less than 5%, as against approximately 22% of the control. Despite the substantial reductions in pigmentation in instant Examples (3a, 3b, and 3c) as compared to control (3d), the instant formulations provided more robustly colored prints which was possibly due to enhanced transfer properties of the preferred embodiments.

EXAMPLE NO. 4

The following example serves to illustrate the advantageous properties of the present invention for embodiments used in hot web offset lithography. The advantages observed in addition to the obvious elimination of volatile organic compound solvents (VOCS) included reduced drying energy requirements, enhanced image sharpness which was reflected in reduced dot gain, reduced ink requirements at comparable image intensities, and enhanced tack stability. Tack is an empirical quantity that reflects the degree of cohesion of a film surface. Tack is an important property of ink, particularly, in the case of high speed printing where the stickiness of ink strongly affects the sharpness of the printed image.

Black ink formulations were prepared by dispersing the indicated proportions of ingredients followed by filtration through 5 micron screening to remove residual oversized solid matter. Subsequently, each composition was run independently on a conventional hot web offset press at a preset speed of approximately 1,100 feet per minute at full coverage. Drying was accomplished in a 30 foot oven using a web temperature and chill roll combination at the lowest controlled temperature needed to effect commercially adequate dry properties required for product folding. Other properties were measured immediately (offline) for the dried product. The ink flow to rollers was adjusted to compensate for varying output and print color intensities during startup in each case.

| Formulation of Example No. 4 | | | | | | |
|---|---|---|---|---|---|---|
| Component (Parts By Weight) | a (Ctl) | b | c | d | e | f |
| HC | 31 | 32 | 40 | 30 | 30 | 30 |
| Heavy Corn Oil | 8 | 8 | — | 5 | 5 | 5 |
| Black Pigment (Carbon Black) | 14 | 14 | 14 | 14 | 14 | 14 |
| Toner (Alkali Blue) | 2 | 2 | 2 | 2 | 2 | 2 |
| Polyethylene Powder | 3 | 3 | 3 | 3 | 3 | 3 |
| Acrylic Resin Powder | — | 4 | 4 | 4 | 4 | 6 |
| 2-Butyl Glycerol Triacrylate | — | 35 | 35 | — | 20 | 40 |
| Surfactant a[1] | 0.5 | 0.5 | 0.5 | 0.5 | 0.5 | 0.5 |
| Surfactant b[2] | 0.5 | 0.5 | 0.5 | 0.5 | 0.5 | 0.5 |
| 520° F. by Naphtha | 40 | — | — | — | — | — |
| Teflon Powder | 1 | 1 | 1 | 1 | 1 | 1 |
| Bisphenol A dimethacrylate | — | — | — | 40 | 21 | — |

The results are presented in Table 4.
NOTES:
[1]Surfactant a = Zirconium IV bis (bis 2,2 propenolatomethyl) butanolato, cyclo bis (bis 2,2 propenolato-methyl) butanolato disphosphato 0,0;
[2]Surfactant b = 1,4 Butynediol.

TABLE 4

|  | a | b | c | d | e | f |
|---|---|---|---|---|---|---|
| Min Dry Temp. (deg. F) | 390 | 355 | 340 | 370 | 355 | 340 |
| 60 Gloss | 61 | 57 | 59 | 55 | 58 | 59 |
| Rub | P | P | P | P | P | P |
| % Dot Gain | 23 | 15 | 11 | 11 | 13 | 8 |
| Apparent Sq. ft. coverage/lb | 980 | 1320 | 1270 | 1405 | 1310 | 1390 |

P = pass; F = fail

The data in Table 4 show that the formulations (4b–4f) of the instant invention dry at lower temperatures and provide significantly enhanced coverage per weight and reduced dot gain over the control (4a). Thus, the preferred embodiments (4b–4f) compare well in terms of a satisfactory rub and gloss with control formulation (4a). In addition to the improved energy efficiency, the VOCS of the instant formulation is reduced from approximately 250 to 400 g/liter of ink to essentially nil.

EXAMPLE NO. 5

The following example is directed to compositions of web heatset inks in accordance with the combined general formulas (I) and (II) which are free of solvent (VOCS) and heavy metal driers or couplers (metal catalysts). The main difficulty in producing acceptable solid heat-set inks using a resinous vehicle is apparently due to the insufficiently uniform particulate size and dispersal of acrylic powder in the absence of solvents (VOCS) or distillates. Instead of pursuing the required extensive milling or grinding by various methods, a new blending process was introduced. Specifically, acrylic thermoplastic resin free of hydrocarbon or distillate solvents was melted into methacrylate ester or fatty acid ester thus effecting a vehicle for inks of uniform consistency and good shelf life. Moreover, it was found that the gloss and drying properties of the solvent-free inks could be enhanced by using solid acrylic resin compounds of both low (about 3,000) and medium (about 17,000) molecular weight in the liquid vehicle.

Accordingly, mixtures of resinous vehicle components were prepared in two separate batches: Batch A consisted of 70% gelled soya oil and 30% acrylic resin (Acryloid ® DM55, solid, Rohm and Haas). Batch B consisted of 90% trimethylene propane trimethacrylate (SR350; Sartomer Corporation) and 10% acrylic resin (Acryloid ® B66, solid, Rohm and Haas). Batch A was heated to about 180° C. to a smooth semi-clear amber colored varnish and cooled to about 100° C. Batch B was heated to about 120° C, stirred and cooled to about 100° C., producing a low viscosity water-white vehicle. Finally, equal amounts of these batches were blended at about 100° C. producing semi-clear amber-colored vehicle of a viscosity very similar to bodied china wood oil (range: 75,000–150,000 centipoise at rest). This liquid vehicle component was designated BDM 3500. Four ink formulations suitable for e.g., high gloss magazine stock are shown below as prepared in the colors yellow (a), magenta (b), cyan (c), and black (d). It is noted that the absence of heavy metal drying agents or coupling agents further avoids serious environmental hazards.

| Components (% Parts by Weight) | (a) | (b) | (c) | (d) |
|---|---|---|---|---|
| Pigment MX yellow (sun) | 13.0 | — | — | — |
| Pigment Rubine (sun) | — | 13.5 | — | — |
| Pigment Phthalocyanine blue (sun) | — | — | 13.5 | — |
| Carbon black regal 400 R (cabot) | — | — | — | 14.0 |
| Alkali blue pigment (sun) | — | — | — | 3.0 |
| bodied China wood oil | 20.0 | 25.0 | 25.0 | 20.0 |
| SR350 | 15.0 | 20.0 | 20.0 | 18.0 |
| BDM 3500 | 46.0 | 36.0 | 36.0 | 40.5 |
| Polyethylene micro wax powder | 2.7 | 1.7 | 1.7 | 1.7 |
| Polytetrafluoroethylene (PTFE) | 1.0 | 1.0 | 1.0 | 1.0 |
| Silicone | 2.0 | 2.5 | 2.5 | 2.6 |
| Hydroquinone | .3 | .3 | .3 | .3 |
| Total (%) | 100 | 100 | 100 | 100 |

The solvent-free ink formulations of Example 5 exhibited excellent printing properties, having only little dot gain acceptable water pickup, exceptional transfer, satisfactory gloss in the finished product, and needing less ink for matching the color density of conventional ink formulations. As shown in Table 5 below, although free of solvents and driers, all inks exhibited working characteristics ranging from acceptable to excellent. For example, the tack sequence as indicated allows the correct sequential deposition of the color inks, starting with black followed by the colors with increasingly lighter hues and commensurately decreasing tack.

TABLE No 5

| | (Web Heatset Inks) | | | |
|---|---|---|---|---|
| Formulation | (a) | (b) | (c) | (d) |
| Water Pick-Up | 59 | 46 | 49 | 43 |
| Tack Sequence | 10.2 | 11.1 | 12.4 | 13.8 |
| Gloss (% of control) | 70 | 70 | 70 | 70 |

EXAMPLE NO. 6

The following example demonstrates the feasibility of using an environmentally acceptable "active oxygen" (hydrogen peroxide) source in conjunction with certain preferred formulations in order to obtain significant reductions in energy consumption and potentially enhanced speed of drying compared to a conventional ink.

This test was directed to heatset inks prepared according to the formulations No. 6 and printed on 100 lb. coated offset paper and 20 mil clear polyethylene terphthalate (Pet) stocks. Samples (6b) and (6c) represent the inventive system comparable to the control sample (6a). The results of these tests are given in Table 6.

| Formulation #6: Heatset Inks | | | |
|---|---|---|---|
| Ingredient part (%) | a (Ctl) | b | c |
| Heavy linseed oil | 28 | 28 | 20 |
| Heavy corn oil | 18 | 18 | 14 |
| Phthalocyanine blue pigment | 12 | 12 | 12 |
| Teflon Powder | 1 | 1 | 1 |
| Polyethylene Powder | 3 | 3 | 3 |
| Surfactant (a) | 1 | 1 | 1 |
| 470 degree mineral spirits | 35 | — | — |
| fumed silica | 2 | 2 | 2 |
| tetramethylol acetone tetramethacrylate | — | 35 | 32 |
| water | — | — | 47 |

Formulated inks were each milled three times prior to application using a standard heatset web press as full coverage patterns at 10,000 impression/hr fountain solutions employed were solvent free guar gum-magnesium nitrate-water and independently guar gum-magnesium nitrate-3% hydrogen peroxide solution. Results are given in Table 6.

TABLE 6

| Formulation (Fountain Solution) | Min. Dry Temp. (deg F) Coated Paper | Min Dry Temp. (deg F) Pet |
|---|---|---|
| Control Formulation #6a (water) | 380 | 390 |
| Control Formulation #6a (Peroxide) | 370 | 370 |
| Test Formulation #6b (Water) | 340 | 350 |
| Test Formulation #6b (Peroxide) | 310 | 320 |
| Test Formulation #6c (Water) | 320 | 320 |
| Test Formulation #6c (Peroxide) | 310 | 320 |

EXAMPLE 7

A similar test is shown in the following Example 7, but now directed to sheet fed ink systems. Again, the control is a related composition of more conventional make-up, comparable to two separate embodiments of the present invention, test 1 and test 2, respectively.

| Formulation #7: Sheet-fed Inks | | | |
|---|---|---|---|
| Ingredient (Part By Weight) | Control | Test #1 | Test #2 |
| Heavy linseed oil | 35 | 35 | 35 |
| Heavy soya oil | 9 | 15 | 15 |
| Carnuba Wax | 3 | 3 | 3 |
| Phthalocyanine blue pigment | 14 | 14 | 14 |
| Teflon Powder | 1 | 1 | 1 |
| Surfactant a | 1 | 1 | 1 |
| 520° mineral spirits | 35 | — | — |
| Fumed silica | 2 | — | — |
| Acrylated castor oil | — | 29 | — |
| TMPTM | — | — | 15 |
| PEM | — | — | 14 |

Formulated inks were each milled three times prior to application on coated paper and PVC stocks using a standard single color (multilith) sheet-fed lithographic press using gum arabic-citric acid and gum arabic-citric acid-6% hydrogen peroxide fountain solutions. The minimum drying times are given in Table 7.

TABLE NO. 7

| Formulation | Min Dry Time (min) Gum/Citrate/Water | Min Dry Time (Min) Gum Citrate/6% |
|---|---|---|
| Control Paper | 55 | 57 |
| Control PVC | >3600 | >3600 |
| Test #1/Paper | <3 | <1 |
| Test #1/PVC | 60 | 12 |
| Test #2/Paper | <3 | <1 |
| Test #2/PVC | 35 | 8 |

The test compositions formulated according to the present invention clearly outperformed the control compositions with regard to rapid drying times both on paper and PVC surfaces (see Table No. 7), thereby demonstrating the advantageous properties of the instant heatset and sheet-fed ink formulations.

Our following embodiments have been found to provide an attractive blend of properties consistent with the needs of the particular industry:

| EXAMPLE 8 I. Newsprint Ink | |
|---|---|
| Formulation | Parts By Weight |
| Acrylated Castor oil | 24 |
| China wood oil | 16 |
| Black pigment | 12 |
| Alkali Blue Pigment | 2 |
| Heavy corn oil | 10 |
| Castor oil | 24 |
| Surfactant[1] | 0.5 |
| Polytetrafluoroethylene (PTFE) | 1 |
| Hydrated Lime | 0.5 |
| Soya Alkyd | 10 |

Note:
[1]Titanium IV 2-propanolato, tris (dioctyl) phenyl sulfonato-O.

| EXAMPLE 9 Coldset Web Ink | |
|---|---|
| Formulation | Parts By Weight |
| Carbon Black Pigment | 16 |
| Alkali Blue pigment | 3 |
| Acrylated castor oil | 15 |
| China wood oil | 20 |
| Soya Alkyd[1] | 4 |
| Heavy corn oil | 10 |
| Surfactant[2] | 0.5 |
| Hydrated lime | 0.5 |
| PTFE | 1.0 |

Notes:
[1]Varchem, Clifton, N.J.;
[2]Titanium IV 2-propanolato, tris (dioctyl) phenyl sulfanato-O
The total invention ingredients: 35 weight %.

| EXAMPLE 10 Sheetfed Plastics/Nonporous Substrate Ink | |
|---|---|
| Formulation | Parts By Weight |
| Trimethylopropane Triacrylate | 15 |
| Trimethylolpropane Trimethacrylate | 28 |
| Red pigment | 15 |
| Butyl Acrylate/Methyl Methacrylate Copolymer | 5 |
| Linseed Alkyd | 16.5 |
| Soya gel | 10 |
| Heavy corn oil | 6 |
| Surfactant[1] | 0.5 |
| Polyethylene | 3 |

-continued

EXAMPLE 10
Sheetfed Plastics/Nonporous Substrate Ink

| Formulation | Parts By Weight |
|---|---|
| PTFE | 1 |

Note:
[1]Titanium IV (bis 2,2-propenolatomethyl)butanolato(bis octyl)diphosphato-O adduct with 2 moles of N,N dimethyl amino propyl (2-methyl) propenoamide.

The above-described arrangement is merely illustrative of the principles of the present invention. Numerous modifications and adaptations thereof will be readily apparent to those skilled in the art without departing from the spirit and scope of the present invention.

What is claimed is:

1. A liquid vehicle for use in ink formulations comprising combinations at least about 10% by weight of each (i) a di unsaturated fatty acid ester, oligo unsaturated fatty acid ester or mixtures thereof and (ii) a difunctional or multi-functional alpha, beta unsaturated carboxylate ester and the balance essentially additives.

2. The liquid vehicle of claim 1 wherein the combined components (i) and (ii) are at least 30% by weight, but each components not less than about 10% by weight of the total liquid vehicle.

3. An ink composition comprising the liquid vehicle of claim 1 in combination with a colorant.

4. The ink composition of claim 3 further comprising a drying agent.

5. The liquid vehicle of claim 1 wherein the components are defined as (i) a di unsaturated fatty acid ester, oligo unsaturated fatty acid ester or mixtures thereof component of general formula, $$[C_nH_{2(n-x)+1}C(O)O{-}]_mR; \quad (I)$$

(ii) a di- or multi-functional alpha, beta unsaturated carboxylate ester or derivative component of general formula, $$[A(H)C{=}C(B)C(O)O{-}]_mR; \quad (II)$$

wherein R is a divalent or oligovalent hydrocarbyl radical or oxygenated hydrocarbyl, radical, said radical having two to eighteen carbon atoms; A and B are independently hydrogen, monovalent hydrocarbyl ligands or oxygenated hydrocarbyl ligands with one to six carbon atoms each ligand; n is an integer ranging from 6 through 21; x is an integer ranging from 2 through 4; and m is an integer ranging from 2 through 11.

6. An ink composition comprising the liquid vehicle of claim 1, wherein component (i) is selected from a group consisting of: China wood oil and methyl lineolate, and component (ii) is selected from a group consisting of: trimethylol propane trimethylacrylate (TMPTM) and phenoxyethyl methacrylate (PEM).

7. A liquid vehicle for use in ink formulation comprising at least about 20% by weight of a mixed ester component combining in a molecule a di unsaturated fatty acid ester, oligo unsaturated fatty acid ester or mixtures thereof and di or multifunctional alpha, beta carboxylate functions or derivatives thereof and the balance essentially additives, said vehicle being curable under substantially ambient conditions.

8. The liquid vehicle of claim 7 wherein the mixed ester component is defined by the general formula, $$[C_nH_{2(n-x)+1}C(O)O{-}]_m[A(H)C{=}C(B)-C(O)O{-}]_mR, \quad (III)$$

wherein
R is a divalent or oligovalent hydrocarbyl radical or oxygenated hydrocarbyl radical, said radical having from two to eighteen carbon atoms; A and B are independently hydrogen, monovalent hydrocarbyl ligands or oxygenated hydrocarbyl ligands of one to six carbon atoms each;
n is an integer ranging from 6 through 21;
x is an integer ranging from 2 through 4; and
m is an integer ranging from 2 through 11.

9. The liquid vehicle of claim 7 wherein the mixed ester component is at least 25% by weight of the liquid vehicle.

10. An ink composition comprising the liquid vehicle of claim 7 in combination with a colorant.

11. The ink composition of claim 10 further comprising a drying agent.

12. An ink formulation comprising the liquid vehicle of claim 8, wherein component (iii) is selected from a group consisting of: trimethylol propane diacrylate linolenate, pentaerythritol trimethylate delta 9-myristate and tri (9-propenato-O)-delta-11-octadecenateo-), propane (1,2,3) triol.

13. A liquid vehicle for coating or ink formulation comprising
(i) a di unsaturated fatty acid ester, oligo unsaturated fatty acid ester or mixtures thereof
(ii) a difunctional or multi-functional alpha, beta unsaturated carboxylate ester component or derivative thereof, and
(iii) a mixed ester component containing both di unsaturated fatty acid, oligo unsaturated fatty acid or mixtures thereof and di or multi-functional alpha, beta unsaturated carboxylate functions or derivative thereof.

14. An ink formulation comprising the liquid vehicle of claim 13 containing at least about 25% by weight of a combination of components (i) and (ii) and at least about 5% by weight of component (iii).

15. An ink formulation consisting essentially of the liquid vehicle of claim 13.

16. The liquid vehicle of claim 1 wherein the di unsaturated fatty acid ester, oligo unsaturated fatty acid ester or mixtures thereof is selected from the group consisting of:
ethylene glycol bis 6,8-undecadienoate,
propylene glycol bis eleomarganate,
pinol hydrate bis eleostearate,
tripropylene glycol bis linoleate,
pentaerythritol tris 7,11-behenadienoate,
arabitol tetrakis 7, 9, 11-tridecatienoate,
linseed oil,
tung oil,
safflower oil,
soya oil,
dehydrated castor oil,
and the difunctional or multi-functional alpha, beta unsaturated carboxylate selected from a group consisting of:
trimethylolpropane trimethacrylate,
trimethylolpropane triacrylate,
glycerol acrylate, bis (methyl) maleate, bis oleyl fumarate,
polybutadiene diacrylate,
pentadecanediol dicrotonate,
tetraethylene glycol bis angelate,
mannitol pentaacrylate,
1,6 hexanediol bis cinnamate,
tris 2-(2-methyl) propenolatoethyl trimelitate.

17. The heavy metal drier-free lithographic ink composition comprising the liquid vehicle of claim 1, a pigment, a surfactant, and a solid resin.

18. The liquid vehicle of claim 13 wherein the components are defined as
(i) a di unsaturated fatty acid ester, oligo unsaturated fatty acid ester or mixtures thereof component of general formula, $$[C_nH_{2(n-x)+1}C(O)O—]_mR; \qquad (I)$$

(ii) a di- or multi-functional alpha, beta unsaturated carboxylate ester or derivative component of general formula, $$[A(H)C=C(B)C(O)O—]_mR; \text{ and} \qquad (II)$$

(iii) a mixed ester component containing both di unsaturated fatty acid, oligo unsaturated fatty acid or mixtures thereof fatty acid and alpha, beta unsaturated di-functional or multi-functional carboxylate ester functions or derivatives thereof according to the general formula, $$[C_nH_{2(n-x)+1}C(O)O—]_m[A(H)C=C(B)-C(O)O—]_mR; \qquad (III)$$

wherein
R is a divalent or oligovalent hydrocarbyl radical or oxygenated hydroxyl radical, said radical having from two to eighteen carbon atoms; A and B are independently hydrogen, monovalent hydrocarbyl ligands or oxygenated hydrocarbyl ligands of one to six carbon atoms each;
n is an integer rangingfrom 6 through 21;
x is an integer ranging from 2 through 4; and
m is an integer ranging from 2 through 11.

19. The liquid vehicle of claim 7 wherein the mixed ester component is selected from a group consisting of:
glyceryl methacrylate, bis eleostearate,
bis linalool maleate,
pentaerythritol bis crotonate, bis linolate,
pinol hydrate acrylate, 9,11-tetradecadienoate,
trimethylol propane bis furoate, eleomargate,
ethylene glycol bis 2,4-undecadienoate,
2-propenoatoethyl linolenate,
castor oil tris 2,4-undecadienoate,
1,2,4-hexanetriol cyclomaleate, 2,4-hexadecadienoate, and
propylene glycol (methyl) itaconate, 4,6-pentadecadienate.

20. An ink formulation for web heatset printing comprising the liquid vehicle of claim 1 which is devoid of solvents and drying or coupling metal catalysts and which comprises at least about 20% by weight, each of trimethylene propane methacrylate ester and the unsaturated fatty acid ester selected from the group consisting of China wood oil and soya oil.

21. An ink formulation for web heatset printing comprising the liquid vehicle of claim 1 which is devoid of solvents and drying or coupling metal catalysts and which comprises the least about 30% by weight each of trimethylene propane trimethylacrylate ester and unsaturated fatty acid ester selected from the group consisting of China wood oil and soya oil.

* * * * *

UNITED STATES PATENT AND TRADEMARK OFFICE
CERTIFICATE OF CORRECTION

PATENT NO. : 5,173,113

DATED : December 22, 1992

INVENTOR(S) : Gerald Sugerman, et al.

It is certified that error appears in the above-identified patent and that said Letters Patent is hereby corrected as shown below:

Column 13,

Claim 2, line 3, after "each" change "components" to —component—.

Column 13,

Claim 5, line 5, add a bracket to the right-hand portion of the formula (I) so that it reads:

$$[C_nH_{2(n-x)+1}C(O)O]_mR$$

Column 13,

Claim 6, lines 3-4, "lineolate" should read —linoleate—.

Column 14,

Claim 8, line 3, change the first character in the chemical formula from "$\delta$" to — [ —.

Column 14,

Claim 16, line 17, after "unsaturated carboxylate" add —esters—.

UNITED STATES PATENT AND TRADEMARK OFFICE
CERTIFICATE OF CORRECTION

PATENT NO. : 5,173,113
DATED : December 22, 1992
INVENTOR(S) : Gerald Sugerman, et al It is certified that error appears in the above-indentified patent and that said Letters Patent is hereby corrected as shown below:

Column 15,
    Claim 18, line 13, after "mixtures thereof" delete "fatty acid";
            line 21, change "hydroxyl" to —hydrocarbyl—; and
            line 26, change "rangingfrom" to —ranging from—.

Column 16,
    Claim 21, line 4, change "the" to —at—.

Signed and Sealed this

Sixteenth Day of November, 1993

Attest:

BRUCE LEHMAN

Attesting Officer      Commissioner of Patents and Trademarks